(12) United States Patent
Roizman et al.

(10) Patent No.: US 12,299,139 B1
(45) Date of Patent: May 13, 2025

(54) ASSESSMENT OF SECURITY RISK FROM AN EXTERNAL COMPUTING ENVIRONMENT

(71) Applicant: LEMA LABS LTD, Tel Aviv (IL)

(72) Inventors: Tomer Roizman, Tel Aviv (IL); Eduard Dovzhik, Kfar Saba (IL); Omer Yehudai, Tel Aviv (IL); Amitai Frey, Tel Aviv (IL); Gal Tashma, Tel Aviv (IL)

(73) Assignee: LEMA LABS LTD, Tel Aviv (IL)

( * ) Notice: Subject to any disclaimer, the term of this patent is extended or adjusted under 35 U.S.C. 154(b) by 0 days.

(21) Appl. No.: 18/635,144

(22) Filed: Apr. 15, 2024

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
CPC .......................... G06F 21/577; G06F 2221/034
USPC ........................................................... 726/25
See application file for complete search history.

(56) References Cited

U.S. PATENT DOCUMENTS

| | | | | |
|---|---|---|---|---|
| 10,735,402 | B1* | 8/2020 | Anderson | H04L 67/10 |
| 11,620,338 | B1* | 4/2023 | Bullard | G06F 16/287 |
| | | | | 707/798 |
| 11,886,826 | B1* | 1/2024 | Bavarian | G06F 40/253 |
| 11,983,488 | B1* | 5/2024 | Puri | G06F 40/103 |
| 12,001,424 | B2* | 6/2024 | Benedict | G06F 16/3329 |
| 12,001,804 | B2* | 6/2024 | Galitsky | G06F 40/253 |
| 2021/0056186 | A1* | 2/2021 | Nygate | G06N 5/04 |
| 2021/0390470 | A1* | 12/2021 | Clearwater | G06Q 10/0635 |
| 2022/0222440 | A1* | 7/2022 | Chowdhury | G06F 16/3344 |
| 2023/0342798 | A1* | 10/2023 | Schultz | G06Q 10/0635 |
| 2024/0104305 | A1* | 3/2024 | Glesinger | G06V 10/421 |
| 2024/0112562 | A1* | 4/2024 | Sicconi | G06N 20/00 |
| 2024/0127153 | A1* | 4/2024 | Amini | G06Q 10/0635 |
| 2024/0185039 | A1* | 6/2024 | Hughes | G06N 3/0455 |

FOREIGN PATENT DOCUMENTS

CN 117787418 * 3/2020

OTHER PUBLICATIONS

Laura Weidinger; Taxonomy of Risks posed by Language Models; AMC:2022; pp. 214-229.*

* cited by examiner

*Primary Examiner* — Monjur Rahim (57) ABSTRACT

There is provided a computer implemented method of assessing a real time security risk from an external computing environment interfacing with a target computing environment, comprising: identifying a plurality of values of a plurality of risk metrics indicative of a security risk from the external computing environment interfacing with the target computing environment, feeding each of the plurality of values of the plurality of risk metrics into a large language model (LLM), and asking the LLM for which question is correlated with an answer to each value of each risk metric, obtaining a plurality of questions from the LLM, obtaining a plurality of responses to the plurality of questions, analyzing mismatches between the plurality of responses and the plurality of values of the plurality of risk metrics indicative of security risk, and computing the real time security risk according to an aggregation of a plurality of mismatches.

23 Claims, 2 Drawing Sheets

ASSESSMENT OF SECURITY RISK FROM AN EXTERNAL COMPUTING ENVIRONMENT

BACKGROUND

The present invention, in some embodiments thereof, relates to network security and, more specifically, but not exclusively, to assessment of risk from an external computing environment.

An external computing environment may refer to any computing infrastructure or system that is located outside of an organization's own physical premises and is accessed remotely. This can include cloud computing platforms, external servers, third-party services, or any other computing resources that are not directly managed or controlled by the organization itself. While external computing environments offer numerous benefits such as scalability, flexibility, and cost-effectiveness, they also pose certain risks that organizations need to be aware of. For example, storing sensitive data in an external computing environment raises concerns about data security and privacy. In another example, external computing environments rely on network connectivity and the availability of external service providers. Any disruptions, outages, or performance issues in the external environment can impact the availability and reliability of services, leading to downtime, loss of productivity, and potential financial losses for organizations.

SUMMARY

According to a first aspect, a computer implemented method of assessing a real time security risk from an external computing environment interfacing with a target computing environment, comprises: identifying a plurality of values of a plurality of risk metrics indicative of a security risk from the external computing environment interfacing with the target computing environment, feeding each of the plurality of values of the plurality of risk metrics into a large language model (LLM), and asking the LLM for which question is correlated with an answer to each value of each risk metric, obtaining a plurality of questions from the LLM, obtaining a plurality of responses to the plurality of questions, analyzing mismatches between the plurality of responses and the plurality of values of the plurality of risk metrics indicative of security risk, and computing the real time security risk according to an aggregation of a plurality of mismatches.

According to a second aspect, a system for assessing a real time security risk from an external computing environment interfacing with a target computing environment, comprising: at least one processor executing a code for: identifying a plurality of values of a plurality of risk metrics indicative of a security risk from the external computing environment interfacing with the target computing environment, feeding each of the plurality of values of the plurality of risk metrics into a large language model (LLM), and asking the LLM for which question is correlated with an answer to each value of each risk metric, obtaining a plurality of questions from the LLM, obtaining a plurality of responses to the plurality of questions based on data obtained from the external computing environment, analyzing mismatches between the plurality of responses and the plurality of values of the plurality of risk metrics indicative of security risk, and computing the real time security risk according to an aggregation of a plurality of mismatches.

According to a third aspect, a non-transitory medium storing program instructions for assessing a real time security risk from an external computing environment interfacing with a target computing environment, which when executed by at least one processor, cause the at least one processor to: identify a plurality of values of a plurality of risk metrics indicative of a security risk from the external computing environment interfacing with the target computing environment, feed each of the plurality of values of the plurality of risk metrics into a large language model (LLM), and asking the LLM for which question is correlated with an answer to each value of each risk metric, obtain a plurality of questions from the LLM, obtain a plurality of responses to the plurality of questions based on data obtained from the external computing environment, analyze mismatches between the plurality of responses and the plurality of values of the plurality of risk metrics indicative of security risk, and compute the real time security risk according to an aggregation of a plurality of mismatches.

In a further implementation form of the first, second, and third aspects, further comprising obtaining real time data from the external computing environment, analyzing the real time data with respect to the questions, labelling the real time data as questions according to the analysis, and wherein the plurality of responses to the plurality of questions are obtained according to the labelling.

In a further implementation form of the first, second, and third aspects, further comprising providing the plurality of question to the external computing environment, and wherein the plurality of responses to the plurality of questions are obtained from the external computing environment.

In a further implementation form of the first, second, and third aspects, further comprising: computing a plurality of weights, each weight is associated with a risk metric for which a mismatch is identified, and computing the assessment of the real time security risk as an aggregation of the plurality of weights.

In a further implementation form of the first, second, and third aspects, further comprising: computing a respective weight for at least one of: context of the interface of the external computing environment with the target computing environment, permissions for the interface, usage of users using the interface, data shared over the interface, and price of integration.

In a further implementation form of the first, second, and third aspects, further comprising: feeding an indication of the mismatches into a machine learning model, and obtaining the assessment of the real time security risk as an outcome of the machine learning model.

In a further implementation form of the first, second, and third aspects, the machine learning model is trained on a training dataset of a plurality of records, wherein a record includes an indication of sample mismatches and a ground truth of a sample assessment of the real time security risk.

In a further implementation form of the first, second, and third aspects, feeding comprises feeding the indication of the mismatches in combination with at least one of: context of the interface of the external computing environment with the target computing environment, permissions for the interface, usage of users using the interface, data shared over the interface, and price of integration.

In a further implementation form of the first, second, and third aspects, feeding comprises feeding the indication of the mismatches in combination with at least one of: financial status of an operator of the external computing environment, geolocation of the external computing environment, legal issues of the operator of the external computing environment, security events experienced by the external computing environment, and intellectual property owned by the external computing environment.

In a further implementation form of the first, second, and third aspects, the mismatches indicate a baseline security risk, and further comprising iterating the features of the method for generating the real time security risk in comparison to the baseline security risk.

In a further implementation form of the first, second, and third aspects, further comprising generating an alert in response to a mismatch between at least one of: payment made to the external computing environment for services is larger than originally approved, when the external computing environment is used by a larger number of users of the target computing environment than originally approved, when the external computing environment is used to transfer data that is different than originally approved, and when the external computing environment has greater access to data of the target computing environment than originally planned.

In a further implementation form of the first, second, and third aspects, the plurality of questions are based on at least one of: retention of data of the target computing environment, backup of data of the target computing environment, tracking of the backup, encryption of data of the target computing environment, and number of records of data of the target computing environment.

In a further implementation form of the first, second, and third aspects, further comprising obtaining at least one dataset from the target computing environment, wherein the plurality of values of the plurality of risk metric are obtained from the at least one dataset.

In a further implementation form of the first, second, and third aspects, the at least one dataset is selected from: audit report, questionnaire to operator of external computing environment, inherent risk questionnaire re risk of external computing environment interfacing with the target computing environment, contract between target computing environment and the external computing environment providing software services to the target computing environment.

In a further implementation form of the first, second, and third aspects, features of the method are implemented in response to at least one of: detection of an increase in privileges for the external computing environment for accessing data hosted by the target computing environment, detection of an expiration of a security authentication of the external computing environment, and identification of a geo-political event impacting a region where the external computing environment is located.

In a further implementation form of the first, second, and third aspects, further comprising: accessing a correlation between the plurality of risk metrics and at least one field of a dataset, accessing the dataset obtained from the external computing environment, identifying a candidate security risk according to a mismatch between the at least one field of the dataset and at least one risk metric according to the correlation, and computing a real time assessment of the security risk according to the candidate security risk.

In a further implementation form of the first, second, and third aspects, the plurality of risk metrics are based include cloud environment permissions.

In a further implementation form of the first, second, and third aspects, cloud environment permissions include at least one of: checking which permissions should be implemented, which permissions actually are implemented, when permissions changed, and if changed what is the change, and the like.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention, in some embodiments thereof, relates to network security and, more specifically, but not exclusively, to assessment of risk from an external computing environment.

As used herein, the term real time may refer, for example, to a margin of error of about 1-6 hours, or 6-12 hours, or 12-24 hours, or 1-2 days, or 3-7 days. The margin of error may be based on the accuracy and/or update intervals of the data used to compute the real time security risk. It is noted that the actual computations may be done on the order of milliseconds or seconds, for example, less than about 0.1 seconds, or 1 second, or 5 seconds, and the like.

An aspect of some embodiments of the present invention relates to systems, methods, computing devices, and/or code instructions (stored on a data storage device and executable by one or more processors) for assessing a real time security risk from an external computing environment interfacing with a target computing environment. For example, the security risk from a software as a service (SaaS) provided by a computing cloud to a server. Multiple values of multiple risk metrics are identified, for example, accessed. Each individual risk metric, or combination of risk metrics, may be indicative (e.g., correlated with and/or predictive) of a potential security risk from the external computing environment interfacing with the target computing environment. For example, the risk metric is the lengths of passwords of users accessing the external computing environment from the target computing environment. The risk metrics may be based on cloud environment permissions. Values of the risk metrics may include, for example, one or more of: checking which permissions should be implemented, which permissions actually are implemented, when permissions changed, and if changed what is the change, and the like. The values of the risk metrics are fed into a large language model (LLM). The values of the risk metrics may be fed individual, and/or as combinations of two or more risk metrics. The LLM may be prompted by asking the LLM for a respective question that is correlated with a respective answer to each value of each risk metric, or combination of two or more risk metrics. For example, the LLM is fed the lengths of passwords, and is prompted for a question. The LLM may respond with the question "What is the minimum length of a password of a user to access the SaaS?". Multiple questions for multiple risk metrics are obtained from the LLM. Responses to the questions are obtained. The responses may be obtained by obtaining real time data from the external computing environment, analyzing the real time data with respect to the questions generated by the LLM to determine the responses. Alternatively, the responses are obtained by providing the questions to the external computing environment, and obtaining multiple responses to the questions from the external computing environment. The responses are analyzed with respect to the risk metrics to identify mismatches. The mismatches (e.g., aggregation thereof) are analyzed for obtaining an indication of an assessment of the real time security risk. In a simple example, when the external computing environment responds that the minimum length of the password to access the SaaS is 8 characters, but in actuality some users were able to use only 2-3 characters, a real time security risk may be identified.

At least some embodiments described herein address the technical problem of obtaining a more accurate security risk of an external computing environment communicating with a target computing environment, optionally via an interface, for example, an API for providing SaaS. The communication between the external computing environment and the target computing environment may create an inherent security risk which may be derived from the very usage of services provides by the external computing environment. For example, use of a communication channel between the target computing environment and the external computing environment create a breach within the target computing environment where the data flows, which may be prone to malicious attack.

Security risk assessment of the external computing environment (e.g., of the third party operating the external computing environment), and/or inherent risk calculation (e.g., as described herein) may be based on a point-in-time assessment that does not allow operators of the target computing environment to be pro-active over time when addressing third party security risk. The calculation of the security risk assessment (e.g., inherent risk and/or other risks as described herein) may be entirely manual. Moreover, such risk assessment may be updated during rare occasions, such as when the business owner of the third party (e.g., whoever brought it to the organization operating the target computing environment) remembers to update the TPRM team.

At least some embodiments described herein improve the technology of network security, for example, improving security of an API for providing SaaS.

At least some embodiments described herein improve upon existing approaches for determining security risk of an external computing environment communicating with a target computing environment. Existing approaches are manual, based on collecting data, and a human mentally analyzing the data to obtain an estimated risk. For example, calculating at the onboarding of the external computing environment, such as using a baseline questionnaire that is manually filled in and/or manually analyzed.

At least some embodiments described herein provide solutions to the aforementioned technical problem, and/or improve the aforementioned technical field, and/or improve upon the aforementioned technical approaches, by providing an approach for automatic and/or dynamic assessment of a security risk of an external computing environment communicating with a target computing environment. The computation of the assessment of the security risk may be computed in real time, optionally iteratively (e.g., daily, weekly), to monitor the security risk, such as for sudden changes. Values of the risk metrics are fed into a LLM. The LLM may be prompted by asking the LLM for a respective question that is correlated with a respective answer to each value of each risk metric, or combination of two or more risk metrics. Multiple questions for multiple risk metrics are obtained from the LLM. Multiple responses to the questions are obtained, for example, by analyzing real time data obtained from the external computing environment with respect to the questions, and/or by directly providing the questions to the external computing environment and obtaining the responses from the external computing environment. The responses obtained from the external computing environment are analyzed with respect to the risk metrics to identify mismatches. The mismatches (e.g., aggregation thereof) are analyzed for obtaining an indication of an assessment of the real time security risk.

Potential advantages of at least some embodiments described herein include:
  Creating a full inventory of all third-parties and/or all external computing environments providing services to the target computing environment, based on tracking siloed data in integrated systems.
  Calculating the initial security risk (e.g., inherent risk) based on extracted data (e.g., artifacts).
  Calculating the real time security risk (e.g., inherent risk) based on data collected from several systems within the target computing environment (e.g., organization that operates the target computing environment).
  Creating insights and/or automatically detecting risks.
  Reducing the time of a third-party reassessment (e.g., of the third-party that operates the external computing environment) by creating an approach, optionally automatic, that may include fewer questions instead of a large number of questions for manual answers.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
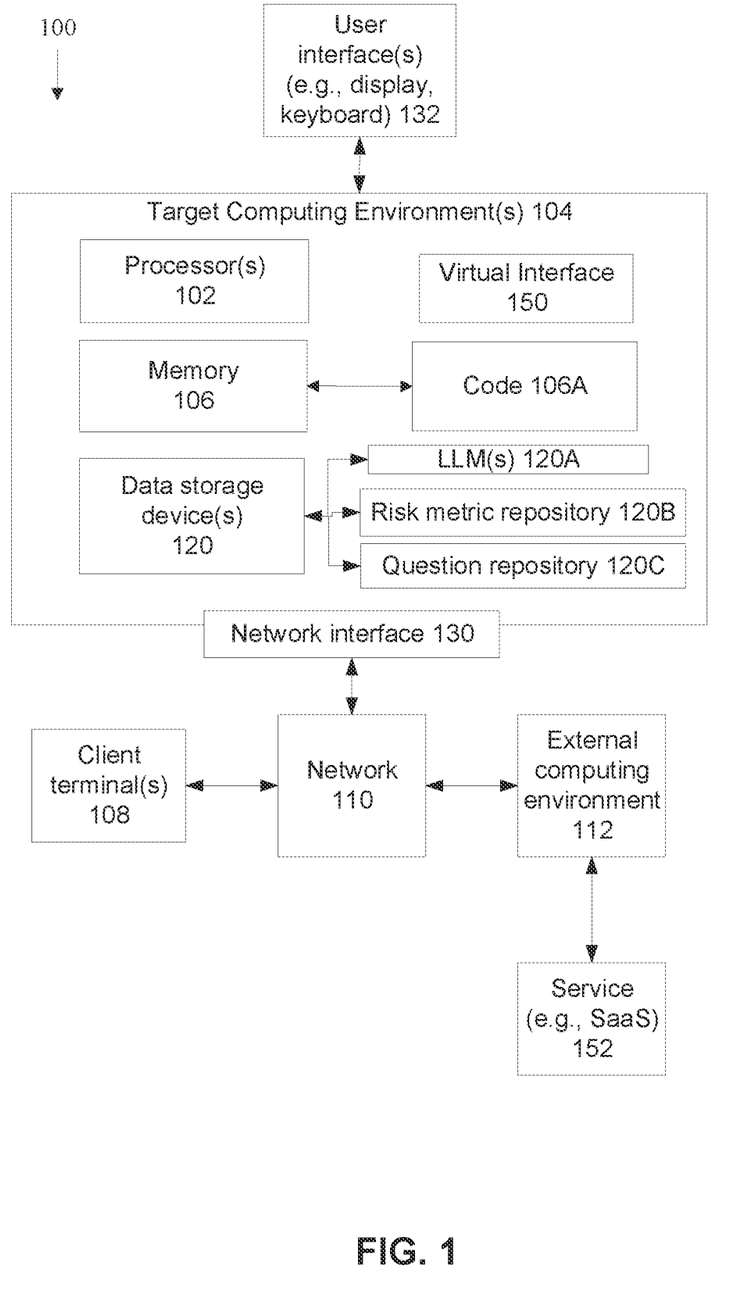
FIG. 1 is a block diagram of components of a system for assessing a real time security risk from an external computing environment interfacing with a target computing environment, in accordance with some embodiments of the present invention.
Figure 2:
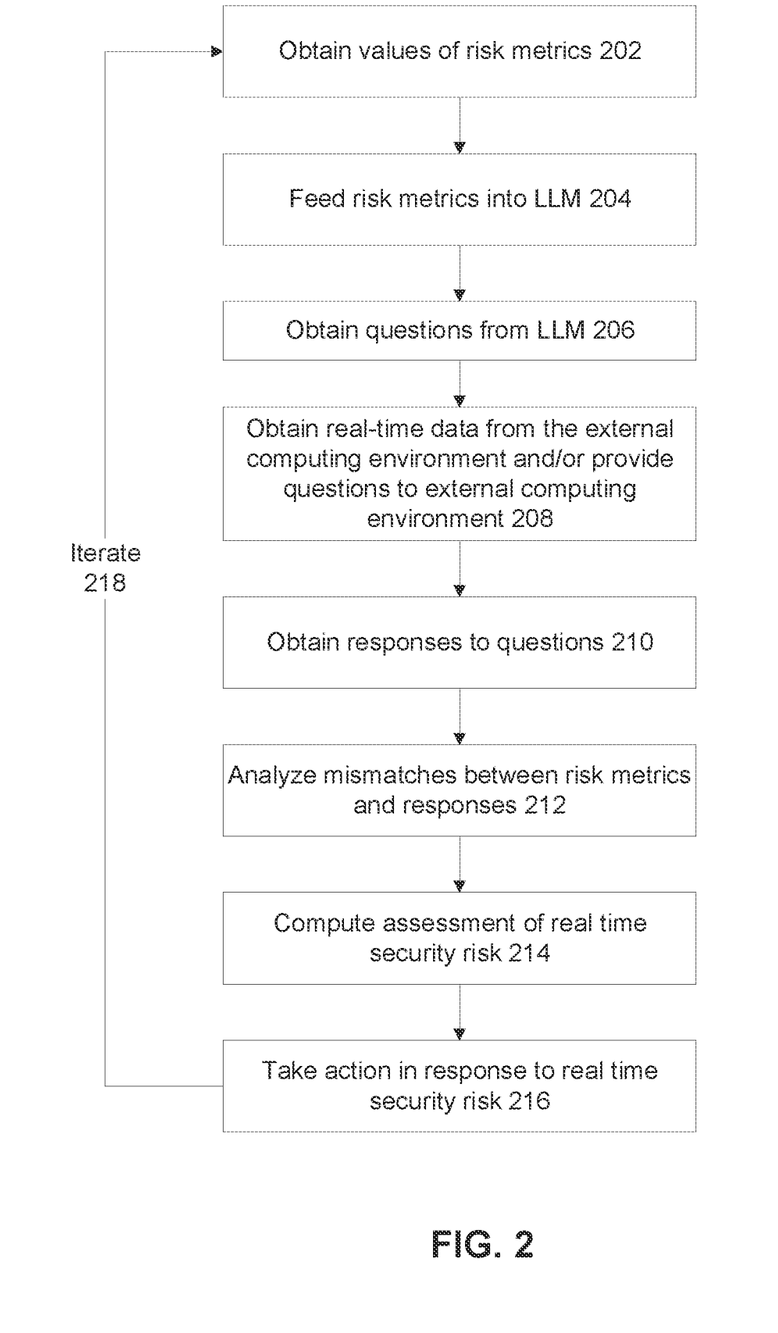
FIG. 2 is a flowchart of a method of assessing a real time security risk from an external computing environment interfacing with a target computing environment, in accordance with some embodiments of the present invention.

Reference is now made to FIG. 1, which is a block diagram of components of a system 100 for assessing a real time security risk from an external computing environment 112 interfacing with a target computing environment 104, in accordance with some embodiments of the present invention. Reference is also made to FIG. 2, which is a flowchart of a method of assessing a real time security risk from an external computing environment interfacing with a target computing environment, in accordance with some embodiments of the present invention.

System 100 may implement the acts of the method described with reference to FIG. 2 by processor(s) 102 of target computing environment 104 executing code instructions 106A stored in a memory 106.

Target computing environment 104 may be implemented as, for example one or more and/or combination of: a computing cloud, a group of connected devices, a server, a virtual server, a client terminal, a virtual machine, a desktop computer, a thin client, a network node, and/or a mobile device (e.g., a Smartphone, a Tablet computer, a laptop computer, a wearable computer, glasses computer, and a watch computer).

Target computing environment 104 may run a virtual interface 150 for communicating with an external computing environment 112. Virtual interface 150 running on target computing environment 104 may be designed to communicate with external computing environment 112. Virtual interface 150 may be implemented as, for example, an application programming interface (API), software development kit (SDK)), an application for local download to target computing environment 104, a remote access session, such as through a web browser executed by target computing environment 104 accessing a web site hosted by external computing environment 112 enabling remote access of service 152, a virtual private network (VPN), and the like.

External computing environment 112 may provide one or more services 152 to target computing environment 104, for example, SaaS.

One or more client terminals 108 may access target computing environment 104, optionally via network 110. The client terminals 108 may utilize services 152 provided by external computing environment 112 to target computing environment 104.

External computing environment 112 may be implemented as and/or hosted by, for example, a computing cloud, a group of connected devices, a server, a virtual server, other architectures, and combinations therefore.

Processor(s) 102 of target computing environment 104 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include a single processor, or multiple processors (homogenous or heterogeneous) arranged for parallel processing, as clusters and/or as one or more multi core processing devices.

Memory 106 stores code instructions executable by processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 106 stores code 106A that implements one or more features and/or acts of the method described with reference to FIG. 2 when executed by processor(s) 102.

Target computing environment 104 may include a data storage device 120 for storing data, for example, one or more LLMs 120A for generating questions in response to one or more risk metrics, a risk metric repository 120B designed to store one or more risk metrics, and a question repository 120C designed to store one or more questions generated by LLM(s) 120A. Data storage device 120 may be implemented as, for example, a memory, a local hard-drive, virtual storage, a removable storage unit, an optical disk, a storage device, and/or as a remote server and/or computing cloud (e.g., accessed using a network connection).

Computing environment 104 may include a network interface 130 for connecting to a network 110, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Network 110 may be implemented as, for example, the internet, a local area network, a virtual network, a wireless network, a cellular network, a local bus, a point to point link (e.g., wired), and/or combinations of the aforementioned.

Target computing environment 104 may include and/or is in communication with one or more physical user interfaces 132 that include a mechanism for a user to enter data (e.g., select the LLM 120A) and/or view data (e.g., view the computed risk assessment). Exemplary user interfaces 132 include, for example, one or more of, a touchscreen, a display, a virtual reality display (e.g., headset), gesture activation devices, a keyboard, a mouse, and voice activated software using speakers and microphone.

Referring now back to FIG. 2, at 202, values of multiple risk metrics are obtained, for example, accessed, computed, and/or extracted. The risk metrics may be indicative of a security risk from the external computing environment interfacing with the target computing environment. For example, the risk metrics may be correlated with the security risk, such as a correlation value above a threshold.

The risk metrics may be based on cloud environment permissions.

The values of the risk metrics that are obtained may be evaluated to determine accuracy, for example, higher than a threshold and/or at one or more accuracy categories. Inaccurate values, such as below the threshold and/or one or more inaccurate categories may be excluded.

Individual risk metrics may be obtained, and/or combinations of risk metrics may be obtained as a set.

Optionally, the risk metrics are automatically extracted from one or more datasets obtained from the target computing environment. Alternatively or additionally, the risk metrics are automatically extracted from one or more datasets obtained from the external computing environment.

Code sensors may automatically monitor one or more dataset which may include risk metrics. The risk metrics may be extracted from the dataset(s) by the code sensors. The code sensor may automatically extract risk metrics from known data correlated with security risk, for example, SOC2 control data, user actions, data transfer sessions, and the like. Alternatively or additionally, the code sensors may automatically extract data which is likely to be risk metrics, for example, based on an analysis of the dataset(s). Examples of datasets include: audit report, questionnaire to the operator of the external computing environment, inherent risk questionnaire regarding security risk of the external computing environment interfacing with the target computing environment, contract between the target computing environment and the external computing environment providing software services to the target computing environment.

The risk metrics may be classified according to the third party (which operates the external computing environment) the risk metric is associated with, such as SaaS provider, identity provider, email provider, and the like. Alternatively or additionally, the risk metrics may be classified according to type, for example, report, vendor questionnaire, inherent risk questionnaire, contract, and the like.

The risk metrics may be relative to a baseline. For example, an initial value of the risk metric is determined, such as using a standard manual approach based on a questionnaire and/or using embodiments described herein. Changes of a current value of the risk metric relative to the baseline may be determined.

Examples of risk metrics include:

Examples of risk metrics based on cloud environment permissions include: checking which permissions should be implemented, which permissions actually are implemented, when permissions changed, and if changed what is the change, and the like.

Inherent risk derived from the very usage of services provided by the external computing environment.

Price of the services offered by the external computing environment.

Important of the external computing environment for continuity of operations of the target computing environment (e.g., business continuity).

Data the external computing environment is exposed to.

Access the external computing environment has to the target computing environment (e.g., organization).

Potential regulatory risk.

How long will it take to replace the external computing environment after it's embedded.

Other criteria which may be specific to the target computing environment and/or to the external computing environment.

Residual risk, which may be the amount of risk of the external computing environment after controls are set. For example, if a contract for the service provided by the external computing environment has a clause that indicates that the third party will be 100% responsible for all possible damages and will pay a penalty of $50 million, then the financial risk is lower, so the residual risk is lower.

Third party risk management (TPRM) artifacts-which may be different types of documents that an organization collects in order to assess the inherent risk, the controls set in place and/or the residual risk of a third-party operating the external computing environment. Examples of documents include contracts (e.g., contractual controls), audit reports (e.g., SOC2, ISO27001), certifications, and questionnaires.

Amount spent by the third party managing the external computing environment (e.g., procurement, payment, SSPM, artifacts (e.g., contract).

Data sharing with the external computing environment (e.g., identity provider, DLP, CASB, SASE).

Environment access (e.g., cloud IAM, CNAPP (e.g., WIZ/ORCA), API gateway.

Usage (e.g., identity provider, EDR, SSPM).

Deployment (e.g., EDR, APM).

Legal/trust/geolocation/assets-open source tracking.

Context of the interface of the external computing environment with the target computing environment.

Access permissions for the interface (e.g., the integration of the external computing environment with the target computing environment).

Usage of users of the target computing environment using the interface (e.g., the integration of the external computing environment with the target computing environment).

Data shared over the interface, and

Price of integration of the external computing environment with the target computing environment.

Data shared from integration of the external computing environment with the target computing environment.

Other examples of risk metrics are presented below in Table 1 and Table 2.

At 204, the risk metrics are fed into a machine learning model, optionally a generative model, such as a large language model (LLM). The LLM may be designed to process natural language.

The risk metrics may be individually fed into the LLM. Alternatively or additionally, a combination of risk metrics is fed into the LLM, for example, simultaneously and/or in a defined data structure such as a string from a concatenation of the risk metrics, a vector from multiple risk metrics, and/or a matrix of the multiple risk metrics. Alternatively or additionally, all risk metrics are fed into the LLM.

Alternatively or additionally, the risk metric may be fed in combination with other data, for example, the classification of the third party the risk metric is associated with, and/or type of risk metric.

The LLM may be prompted, by asking the LLM for a question is correlated with an answer to each value of each risk metric, or combination of risk metrics. The values of the risk metrics are defined as answers, and the LLM is prompted to generate questions to which the correct answers are the values of the risk metrics.

The LLM may be pre-trained, and/or of a suitable architecture. Embodiments described herein may relate to a model agnostic infrastructure, in which the machine learning model, such as LLM, may be changed, for example, to a more updated version, and/or to a more focused version.

At 206, the questions are obtained as outcomes of the LLM. The questions may be individually generated, and/or generated as a set. The questions may be represented as text and/or strings, enabling a human to answer them. Alternatively or additionally, the questions may be represented as code instructions (e.g., script) which may be locally executed by the external computing environment to obtain the responses.

For example, in a case where the external computing environment access data stored on the target computing environment, the questions may be based on one or more of:

Retention of data of the target computing environment. For example, "How long does the data remain stored on the target computing environment?"

Backup of data of the target computing environment. For example, "What backup mechanism is used?"

Tracking of the backup. For example, "What mechanism is used to track the backups?"

Encryption of data of the target computing environment. For example, "What encryption approach is used to encrypt the data?"

Number of records of data of the target computing environment. For example, "How many records of data of the target computing environment are backed up by the external computing environment?"

At 208, real time data is obtained from the external computing environment. The real time data may be considered as implied response to the questions, without necessarily providing the questions to the external computing environment.

Alternatively, the questions may be provided to the external computing environment, and/or to another computing device such as proxy of the external computing environment. For example, the questions may be sent to the external computing environment over the virtual interface and/or over another communication channel.

At 210, responses to the questions generated by the LLM are obtained.

Optionally, the responses to the questions generated by the LLM are obtained by analyzing the real time data with respect to the questions. The real time data may be labelled as response to the questions according to the analysis. The analysis may be done, for example, by another LLM that is fed the data and the questions, and trained to tag the data as responses to the questions.

Alternatively, responses to the questions are obtained from the external computing environment and/or from the other computing device. The responses may be generated automatically and/or manually on the side of the external computing environment.

Alternatively or additionally, such as in the case of a contract between the target computing environment and the external computing environment to provide the service, the responses to the question may be an indication of whether there are clauses in the contract addressing the question (i.e., the values of the risk metric) or not.

The security risk for the external computing environment may be determined based on the questions generated by the LLM.

At 212, mismatches between the responses to the questions (e.g., based on the analysis of data obtained from the external computing environment, and/or directly obtained from the external computing environment) and the values of the risk metrics are identified.

Mismatches may be identified, for example, by one or more of:

Lack of exact match.

Defining a range of error, and determining whether the response is within the range of error or external.

Computing a correlation between the response and value of the risk metric, and determining whether the correlation value is below a threshold indicating mismatch.

Results of a matching process may be binary, for example, match or mismatch. Alternatively, the results of the matching process may be on a scale and/or a continuous value, for example, a value between 0 and Optionally, weights are computed. Each risk metric may be associated with a respective weight. Optionally, a respective weight may be computed per risk metric for which a mismatch is identified.

The weights may be computed based on context of the target computing environment and/or the external computing environment.

The weights may be a heuristic third party (i.e., operator of the external computing environment) context weights.

The weights may be dynamically computed and/or dynamically updated, such as within a time interval during which the mismatch is identified. Alternatively or additionally, one or more weights may be manually set.

The sum of the weights may be a constant, for example, 1 or 100. The weights may be evenly distributed amongst the risk metrics, optionally risk metrics for which a mismatch is identified. Alternatively, the weights may be uneven, for example, cost is assigned a weight of 0.35, data is assigned a weight of 0.35, access is assigned a weight of 0.2, and business is assigned a weight of 0.1.

Optionally, possible values for each risk metric are assigned to multiple categories. Each category may be assigned a certain weight. For example, categories may include an indication of severity: critical, high, medium, and low, where each category is associated with a respective weight. For example, critical has a weight of 0.55, high 0.25, medium 0.15, and low 0.05. Different values of the risk metric may be assigned different weights according to their respective categories. Alternatively or additionally, the weight is a combination of a type of risk metric and indication of severity.

Table 1 below presents examples of values of risk metrics for which mismatches may be found, and for which weights may be assigned. The top cell of each column represents a respective risk metric. Cells below the top cell represent possible values for the risk metric, grouped according to severity categories (i.e., critical, high, medium, and low). The weight may be assigned as a combination of the risk metric, and category corresponding to the value of the risk metric.

TABLE 1

| Severity | Access | Data obtained from the external computing environment | Who is using the data from the external computing environment | For what purpose is the data being used | Cost of services provided by the external computing environment |
|---|---|---|---|---|---|
| Critical | Infra Data Modification; Infra Data access; Infra Operation environment modification | Customer Data; Financials of Company running external computing environment | Legal, IT, Finance, Security, R&D | Critical to one or more business departments; Supporting Main Infrastructure/Product | >10M |
| High | Infra IAM; Infra Config management | Company prod data/Access, logs, apps, etc.. | HR, Operations, Sales | Supporting Main Workflows; Critical for employee productivity/efficiency | 500K < X < 1M 100K < X < 500K |
| Medium | Employee Config/IAM | Logs: employee personal data | Marketing, Customer Success | Workflow management | 10K < X < 100K |
| Low | Employee Data Modification; Employee Data Access | | | Personal Usage/Non-critical workflow management | X < 10K |

Table 2 below presents additional examples of values of risk metrics for which mismatches may be found, and for which weights may be assigned. The risk metrics are based on properties of the external computing environment (referred to as Vendor).

TABLE 2

| Severity | Vendor Compliance | Vendor Financials | Vendor Geographics | Vendor Reputation |
| --- | --- | --- | --- | --- |
| Critical | Does not have any attestations | Startup with no funding attestations and assurance | Warzone/ Sanctioned places/ Countries with shady privacy laws | More than one high profile breach in the past 3 years |
| High | Un-verified Attestation/ SOC1/ Independent policies/ Questionnaire only/ Whitepapers Only | Backed Startup/ Public Company with bad financials | | |
| Medium | SOC2/ISO + Pentest + Policies and whitepapers | Backed Startup with insurance policy | Very susceptible to force major events | One medium-high profile breach in the past 3 years |
| Low | Third-Party provided audit report + pentest report + certifications | Public Company with good financials | None of the above | No breaches reported |

At 214, an assessment of the real time security risk is computed according to one or more of the mismatches, optionally according to an aggregation of the mismatches, optionally according to an aggregation of the weights identified for the mismatches.

The assessment of the real time security risk may be computed as an aggregation of the weights. For example, using an aggregation function which is a weighted average of the assigned weights, as follows:
(Sum of (Category_Score times Category weight)) Divided by (Sum of Weights), where each classification category has a score between 0 and 100 (or other range), where 0 is lowest risk and 100 is highest risk.

Alternatively or additionally, the assessment of the real time security risk may be obtained as an outcome of a machine learning model fed indications of the mismatches. The machine learning model may be trained on a training dataset of records. A record may include an indication of one or more sample mismatches and a ground truth of a sample assessment of the real time security risk. Such training dataset may be used for supervised training of the machine learning model.

Alternatively or additionally, the machine learning model may be trained using a self-supervised approach. For example, a feeding loop that works as following: preprocessing of inputs, sending processed inputs to the machine learning model, post processing of the outputs, re-sending processed outputs to the machine learning model with different prompting, and calculating an overall probability of mismatch. The feeding loop is based on a self-supervised approach for training the machine learning model, implemented using a set of prompts for preprocessing, post processing, and matching expected "good" responses to the actual response to the question.

Exemplary architectures of machine learning models described herein include, for example, statistical classifiers and/or other statistical models, neural networks of various architectures (e.g., convolutional, fully connected, deep, encoder-decoder, recurrent, transformer, graph), support vector machines (SVM), logistic regression, k-nearest neighbor, decision trees, boosting, random forest, a regressor, and/or any other commercial or open source package allowing regression, classification, dimensional reduction, supervised, unsupervised, semi-supervised, and/or reinforcement learning. Machine learning models may be trained using supervised approaches and/or unsupervised approaches.

The indication of the mismatches may be fed into the machine learning model in combination with one or more additional data elements. The record may include the additional data element(s) in a combination with the sample mismatches. Examples of additional data elements include:
- Context of the interface of the external computing environment with the target computing environment.
- Permissions for the interface between the external computing environment and the target computing environment.
- Usage of users using the interface. For example, heavy usage such as continuous connections, or sporadic usage where the user connects for a short time and then is disconnected for a long time.
- Data shared over the interface. For example, sensitive data such as bank details, or non-private data which is publicly posted on the internet.
- Price of integration. For example, a high price may indicate reduced risk, where as a low price may indicate higher risk due to likelihood of reduced quality.
- Financial status of an operator of the external computing environment. For example, sufficient funding to operator, or lack of funding indicating risk of closure and/or downtime.
- Geolocation of the external computing environment. For example, which city, county, state, and/or country the external computing environment is physically located in. Geolocation may be associated with risk, for example, severe weather, war, and/or infectious diseases attack which may take down service.
- Legal issues of the operator of the external computing environment. For example, lawsuit, fine, and regulatory issues.

Security events experienced by the external computing environment. For example, hack, malware attack, and security breach.

Intellectual property owned by the external computing environment. For example, filed patents and/or trademarks.

Alternatively or additionally, the aforementioned additional data elements may be treated as data sources from which values of risk metrics are extracted.

Alternatively or additionally, a correlation between one or more risk metrics and one or more fields of one or more datasets of the external computing environment are computed and/or accessed. For example, the correlations may be represented by Table 1 and/or Table 2, where each possible value of each risk metric is mapped to a certain severity category. The dataset, such as used to create Table 2, may be accessed from the external computing environment, for example, via the virtual interface. The value of the risk metric(s) may be compared to the correlated field(s) to identify mismatches. For example, a current value of the risk metric falls into a critical category, whereas a low category is expected (e.g., the baseline value fell into the low category). A candidate security risk may be identified in response to the mismatch, for example, the current value is used rather than the expected value. The candidate security risk may be used for computing the real time assessment of the security risk, which may provide a more accurate real time assessment of the risk, and/or which may indicate the change in assessment of the risk.

Alternatively or additionally, the security risk may be based on identifying one or more significant mismatches, which may be correlated with significant security risk. For example, a high security risk may be identified in response to the external computing environment (e.g., third-party operating the external computing environment) which is granted access to data of the target computing environment, experiencing one or more of the following mismatches: exception, missing answer to a significant question, answered no to a question regarding employee screening, and/or answered no to a question regarding a background check.

At 216, one or more actions may be taken in response to the real time security risk, and/or in response to one or more of the mismatches.

The action may include generation of a message indicating the real time security risk and/or mismatch. The message may be, for example, presented on a display of a client terminal, pushed to a client terminal, sent by email, added to a log, and the like.

Alternatively or additionally, the action may include activation of an automated security process, for example, a malware detector, a virtual vault for isolation of a process which is potentially malicious, change of access privileges to certain users and/or certain processes, automatic logging of activity related to the security risk, and the like.

Examples of mismatches that may trigger actions include:
Payment made to the external computing environment for services is larger than originally approved.

The external computing environment is used by a larger number of users of the target computing environment than originally approved, The external computing environment is used to transfer data that is different than original approved, and The external computing environment has greater access to data of the target computing environment than originally planned.

At 218, features described with reference to 202-216 may be iterated.

A baseline security risk may be identified in a baseline iteration, for example, an initial iteration and/or a selected iteration such as after a security check by an IT expert. The baseline security risk may be based on a baseline state of mismatches. During subsequent iterations, a current real time security risk may be determined in comparison to the baseline security risk. For example, the baseline and current security risks are represented as vectors, and a distance (e.g., Euclidean) between the vectors is computed. A distance above a first threshold may represent a significant increase in security risk. In another example, a distance below a second threshold may represent a significant decrease in security risk. A distance between the first and second thresholds may indicate no significant change to the security risk. In another example, a correlation between the mismatches of the baseline iteration and a current iteration may be computed. The correlation may be compared to a threshold to determine significant increase in security risk, significant decrease in security risk, and/or no significant change.

Alternatively or additionally, the baseline security risk may be computed using traditional approaches, such as by the third party operator of the external computing environment filling out the questionnaire, and a human domain expert manually determining the baseline security risk. Subsequent iterations may be automated based on embodiments described herein, for dynamic and/or real time tracking of changes of the current security risk relative to the baseline security risk.

The iterations may be performed in predefined intervals, for example, once an hour, once every 12 hours, once a day, once a week, and the like. In another example, the iterations may be performed in response to one or more defined events, for example:

Detection of an increase in privileges for the external computing environment for accessing data hosted by the target computing environment.

Detection of an expiration of a security authentication of the external computing environment.

Identification of a geo-political event impacting a region where the external computing environment is located, for example, war, breakout of infectious disease, election results, and the like.

The iterations may be performed per external computing environment, and/or per service (where multiple services may be provided by a common external computing environment). For example, each risk metric may be analyzed to determine which external computing environment it belongs to. The respective risk metric may be included in the computation for security risk assessment for the corresponding external computing environment. For risk metrics associated with a new external computing environment, a new risk assessment may be performed for the new external computing environment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant external computing devices will be developed and the scope of the term external computing device is intended to include all such new technologies a priori.

As used herein the term "about" refers to +10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of assessing a real time security risk from an external computing environment interfacing with a target computing environment, comprising:

identifying a plurality of values of a plurality of risk metrics, each of the plurality of risk metrics is indicative of a security risk associated with the external computing environment interfacing with the target computing environment;

feeding each of the plurality of values of the plurality of risk metrics into a large language model (LLM);

asking the LLM to generate for each value of each risk metric, at least one question that is correlated with an answer related to said each value of said each risk metric;

obtaining a plurality of questions from the LLM, generated following said asking;

obtaining a plurality of responses to the plurality of questions;

analyzing mismatches between the plurality of responses and the plurality of values of the plurality of risk metrics; and computing the real time security risk according to an aggregation of a plurality of mismatches analyzed by said analyzing;

computing a plurality of weights, each weight is associated with a risk metric for which a mismatch is identified, and computing an assessment of the real time security risk as an aggregation of the plurality of weights.

2. The computer implemented method of claim 1, further comprising obtaining real time data from the external computing environment, analyzing the real time data with respect to the questions, labelling the real time data as questions according to the analysis, and wherein the plurality of responses to the plurality of questions are obtained according to the labelling.

3. The computer implemented method of claim 1, further comprising providing the plurality of question to the external computing environment, and wherein the plurality of responses to the plurality of questions are obtained from the external computing environment.

4. The computer implemented method of claim 2, further comprising:
computing a respective weight for at least one of:
context of the interface of the external computing environment with the target computing environment,
permissions for the interface,
usage of users using the interface,
data shared over the interface, and
price of integration.

5. The computer implemented method of claim 1, further comprising:
feeding an indication of the mismatches into a machine learning model, and
obtaining the assessment of the real time security risk as an outcome of the machine learning model.

6. The computer implemented method of claim 5, wherein the machine learning model is trained on a training dataset of a plurality of records, wherein a record includes an indication of sample mismatches and a ground truth of a sample assessment of the real time security risk.

7. The computer implemented method of claim 5, wherein feeding comprises feeding the indication of the mismatches in combination with at least one of:
context of the interface of the external computing environment with the target computing environment,
permissions for the interface,
usage of users using the interface,
data shared over the interface, and
price of integration.

8. The computer implemented method of claim 5, wherein feeding comprises feeding the indication of the mismatches in combination with at least one of: financial status of an operator of the external computing environment, geolocation of the external computing environment, legal issues of the operator of the external computing environment, security events experienced by the external computing environment, and intellectual property owned by the external computing environment.

9. The computer implemented method of claim 1, wherein the mismatches indicate a baseline security risk, and further comprising iterating the features of the method for generating the real time security risk in comparison to the baseline security risk.

10. The computer implemented method of claim 1, further comprising generating an alert in response to a mismatch between at least one of:
payment made to the external computing environment for services is larger than originally approved,
when the external computing environment is used by a larger number of users of the target computing environment than originally approved,
when the external computing environment is used to transfer data that is different than originally approved, and
when the external computing environment has greater access to data of the target computing environment than originally planned.

11. The computer implemented method of claim 1, wherein the plurality of questions are based on at least one of: retention of data of the target computing environment, backup of data of the target computing environment, tracking of the backup, encryption of data of the target computing environment, and number of records of data of the target computing environment.

12. The computer implemented method of claim 1, further comprising obtaining at least one dataset from the target computing environment, wherein the plurality of values of the plurality of risk metric are obtained from the at least one dataset.

13. The computer implemented method of claim 12, wherein the at least one dataset is selected from: audit report, questionnaire to operator of external computing environment, inherent risk questionnaire re risk of external computing environment interfacing with the target computing environment, contract between target computing environment and the external computing environment providing software services to the target computing environment.

14. The computer implemented method of claim 1, wherein features of the method are implemented in response to at least one of:
detection of an increase in privileges for the external computing environment for accessing data hosted by the target computing environment,
detection of an expiration of a security authentication of the external computing environment, and
identification of a geo-political event impacting a region where the external computing environment is located.

15. The computer implemented method of claim 1, further comprising:
accessing a correlation between the plurality of risk metrics and at least one field of a dataset;
accessing the dataset obtained from the external computing environment;
identifying a candidate security risk according to a mismatch between the at least one field of the dataset and at least one risk metric according to the correlation; and
computing a real time assessment of the security risk according to the candidate security risk.

16. The computer implemented method of claim 1, wherein the plurality of risk metrics are based include cloud environment permissions.

17. The computer implemented method of claim 16, wherein cloud environment permissions include at least one of: checking which permissions should be implemented, which permissions actually are implemented, when permissions changed, and if changed what is the change, and the like.

18. A system for assessing a real time security risk from an external computing environment interfacing with a target computing environment, comprising:
at least one processor executing a code for:
identifying a plurality of values of a plurality of risk metrics, each of the plurality of risk metrics is indicative of a security risk associated with the external computing environment interfacing with the target computing environment;
feeding each of the plurality of values of the plurality of risk metrics into a large language model (LLM);
asking the LLM to generate for each value of each risk metric, at least one question that is correlated with an answer related to said each value of said each risk metric;
obtaining a plurality of questions from the LLM, generated following said asking;
obtaining a plurality of responses to the plurality of questions based on data obtained from the external computing environment;
analyzing mismatches between the plurality of responses and the plurality of values of the plurality of risk metrics; and
computing the real time security risk according to an aggregation of a plurality of mismatches analyzed by said analyzing;

computing a plurality of weights, each weight is associated with a risk metric for which a mismatch is identified, and computing an assessment of the real time security risk as an aggregation of the plurality of weights.

19. A non-transitory medium storing program instructions for assessing a real time security risk from an external computing environment interfacing with a target computing environment, which when executed by at least one processor, cause the at least one processor to:

identify a plurality of values of a plurality of risk metrics, each of the plurality of risk metrics is indicative of a security risk associated with the external computing environment interfacing with the target computing environment;

feed each of the plurality of values of the plurality of risk metrics into a large language model (LLM);

ask the LLM to generate for each value of each risk metric, at least one question that is correlated with an answer related to said each value of said each risk metric;

obtain a plurality of questions from the LLM, generated following said asking;

obtain a plurality of responses to the plurality of questions based on data obtained from the external computing environment;

analyze mismatches between the plurality of responses and the plurality of values of the plurality of risk metrics; and compute the real time security risk according to an aggregation of a plurality of mismatches analyzed by said analyzing, compute a plurality of weights, each weight is associated with a risk metric for which a mismatch is identified, and compute an assessment of the real time security risk as an aggregation of the plurality of weights.

20. The computer implemented method of claim 1, wherein at least one risk metric is a length of passwords of users accessing the external computing environment from the target computing environment.

21. The computer implemented method of claim 1, wherein some of said plurality of risk metrics are correlated with at least one of user actions and data transfer sessions.

22. The computer implemented method of claim 1, wherein said plurality of risk metrics are members of a group consisting of:

price of services offered by the external computing environment, importance of the external computing environment for continuity of operations of the target computing environment, data the external computing environment is exposed to, access the external computing environment has to the target computing environment, and potential regulatory risk.

23. The computer implemented method of claim 1, wherein said plurality of values of said plurality of risk metrics are members of a group consisting of: checking which permissions should be implemented, which permissions actually are implemented, when permissions changed, and if permission changed what is the change.

* * * * *